US012704108B2

(12) United States Patent
Cauas et al.

(10) Patent No.: US 12,704,108 B2
(45) Date of Patent: Aug. 11, 2026

(54) AXIAL PISTON MACHINE WITH NEUTRAL VALVE INTEGRATED IN THE POT-LIKE HOUSING PART

(71) Applicant: Robert Bosch GmbH, Stuttgart (DE)

(72) Inventors: Horst Cauas, Blaustein (DE); Ulrich Schill, Ulm (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 19/087,245

(22) Filed: Mar. 21, 2025

(65) Prior Publication Data

US 2025/0314231 A1 Oct. 9, 2025

(30) Foreign Application Priority Data

Apr. 9, 2024 (DE) ..................... 10 2024 203 205.0

(51) Int. Cl.
*F03C 1/00* (2006.01)
*F03C 1/06* (2006.01)

(52) U.S. Cl.
CPC .............. *F03C 1/002* (2013.01); *F03C 1/003* (2013.01); *F03C 1/0607* (2013.01)

(58) Field of Classification Search
CPC ........ F03C 1/003; F03C 1/002; F03C 1/0607; F16H 61/431
See application file for complete search history.

(56) References Cited

U.S. PATENT DOCUMENTS

2004/0003590 A1* 1/2004 Kado .................... F16H 61/438 60/431
2020/0103023 A1* 4/2020 Hoegerle .............. F16H 61/438
2020/0332891 A1* 10/2020 Bender ..................... F04B 1/12

FOREIGN PATENT DOCUMENTS

DE 10 2023 210 960 B3 10/2024
DE 102023210958 B3 * 10/2024 ............ F04B 49/225

OTHER PUBLICATIONS

"Axialkolben-Verstellpumpe A4VG Baureihe 40", Data Sheet RD 92004/2020-03-30, Mar. 30, 2020, Bosch Rexroth, Elchingen, Germany.
"Axial piston variable pump AV4G Series 40", Data Sheet RE 92004/2020-03-30, Mar. 30, 2020, Bosch Rexroth, Elchingen, Germany.
"Axialkolben-Verstellpumpe A4VG Baureihe 35", Data Sheet RD 92035/2020-02-12, Feb. 12, 2020, Bosch Rexroth, Elchingen, Germany.
"Axial piston variable pump AV4G Series 35", Data Sheet RE 92035/2020-02-12, Feb. 12, 2020, Bosch Rexroth, Elchingen, Germany.

* cited by examiner

*Primary Examiner* — Abiy Teka
(74) *Attorney, Agent, or Firm* — Maginot, Moore & Beck LLP

(57) ABSTRACT

An axial piston machine has a displacement volume that is adjustable by a double-acting control cylinder, which is connected to an auxiliary pump via a fluid flow path that includes a first, a second, and a third control assembly. The transfer point is the point of the fluid flow path at which the plate-like housing part contacts the pot-like housing part. The receiving bore of the first, second, and third control assemblies are each arranged directly in the pot-like housing part. The part of the fluid flow path which is arranged downstream of the transfer point extends over its entire length directly in the pot-like housing part.

9 Claims, 7 Drawing Sheets

AXIAL PISTON MACHINE WITH NEUTRAL VALVE INTEGRATED IN THE POT-LIKE HOUSING PART

This application claims priority under 35 U.S.C. § 119 to application no. DE 10 2024 203 205.0, filed on Apr. 9, 2024 in Germany, the disclosure of which is incorporated herein by reference in its entirety.

The disclosure relates to an axial piston machine.

BACKGROUND

From the data sheet "Axialkolben-Verstellpumpe A4VG Baureihe 40" of Bosch Rexroth AG (order number RD92004; edition 30 Mar. 2020), an axial piston machine in a swashplate design is known, the displacement volume of which is adjustable by means of a double-acting control cylinder. In the variant "ET-adjustment", the control cylinder is adjusted with two pressure-reducing valves, which are mounted on the outside of the control cylinder. Optionally, the control cylinder may be equipped with a neutral valve, which is mounted on the exterior of the control cylinder. With the neutral valve, both control chambers of the control cylinder may be connected to the substantially unpressurized interior of the housing, such that the displacement volume adjusts to zero, regardless of the adjustment of the pressure-reducing valves. The control cylinder is supplied with pressurized fluid from an auxiliary pump integrated into the axial piston machine.

From the data sheet "Axialkolben-Verstellpumpe A4VG Baureihe 35" of the Bosch Rexroth AG (order number RD 92035, edition Dec. 2, 2020), a similar axial piston machine is known, which can also be configured with an ET adjustment. The pressure-reducing valves therein are configured as built-in valves, which are installed directly in the pot-like housing part, which also houses the control cylinder. This axial piston machine cannot be equipped with a neutral valve. Not even if a plurality of bores are subsequently inserted into the pot-like housing part to provide the required connections.

SUMMARY

The present disclosure has the advantage that the axial piston machine may or may not be equipped with a third control assembly in the form of a neutral valve as per customer request. Moreover, a plurality of further adjustment variants may be provided, solely by selecting the corresponding built-in valves. Regardless of the installation variant selected, the same pot-like housing part can be used without having to remachine it for each order. It can therefore be manufactured inexpensively in large batches. An expensive supply of different variants of the pot-like housing part can be dispensed with.

According to the disclosure, it is proposed that the transfer point is the point of the fluid flow path at which the plate-like housing part contacts the pot-like housing part, wherein the receiving bore of the first, the second and the third control assemblies are each arranged directly in the pot-like housing part, wherein the part of said fluid flow path, which is arranged downstream of the transfer point, extends over its entire length directly in the pot-like housing part. The receiving bores of the first and the second control assembly are preferably identical to each other. The first and/or the second and/or the third control assembly is preferably configured as a built-in valve.

It may be provided that the receiving bores of the first, the second and third control assembly each define a central axis, wherein the relevant return point, the relevant outlet point and the respective inlet point are each arranged in the order indicated along the respective central axis, wherein the respective feed point is arranged on a side of the respective receiving bore which is open towards the surroundings of the axial piston machine. All three return points are thus arranged adjacent to the interior of the housing so that the corresponding connection can be easily established. The connection between the return points of the first, the second and the third control assemblies and the interior of the housing preferably runs exclusively in the pot-like housing part. The aforementioned receiving bores are preferably configured as stepped bores, wherein the return point, the outlet point and the inlet point have different diameters.

It may be provided that a control piston of the control cylinder is linearly movable along a control axis, wherein the control piston segments the first and second control chambers from each other, wherein the first, third and second control assemblies are arranged next to each other in a direction parallel to the control axis in the specified order. Accordingly, the third control assembly is arranged between the first and second control assemblies. The third control assembly does not increase the required installation space for the entire axial piston machine. The bores in the pot-like housing part explained below are simple and inexpensive to manufacture. The paths from the first and second control assemblies to the first or second control chambers are very short. The control axis is preferably arranged perpendicularly and at distance to the axis of rotation of the axial piston pump/motor.

It may be provided that the inlet point of the first and second control assemblies and the outlet point of the third control assembly are arranged in alignment with one another in a direction parallel to the control axis, wherein the corresponding portion of the fluid flow path is formed exclusively from a straight first bore, which directly intersects the inlet point of the first and second control assemblies and outlet point of the third control assembly in each case. Thus, a lengthwise large proportion of the fluid flow path is formed from a single straight first bore. This can be drilled into the overall complex pot-like housing part easily and inexpensively.

It may be provided that the receiving bore of the third control assembly directly opens out into the interior of the housing. Accordingly, the return point of the third control assembly is permanently fluidly connected to the interior of the housing by the shortest route. In the area of the third control assembly, a small wall thickness of the pot-like housing part is sufficient to provide the corresponding receiving bore. In the first and second control assemblies, the corresponding connection to the interior is preferably provided via a respective associated channel in the pot-like housing part, because they are arranged far outwards on the pot-like housing part.

It may be provided that the said fluid flow path between the transfer point and the inlet point of the third control assembly is formed exclusively from a straight second bore. The second bore may be drilled from the transfer point. A separate locking screw for the second bore is not required.

It may be provided that the first and second bores are arranged substantially perpendicular to each other, wherein their central axes are arranged spaced apart from each other.

It may be provided that the third control assembly is formed from a blind plug which permanently establishes a fluidic connection between the respective inlet point and the respective outlet point, wherein it permanently blocks the respective return point. With the blind plug, an installation variant of the axial piston machine may be provided that is not equipped with the neutral valve. It would now be conceivable to provide a variant of the pot-like housing part, in which the second bore directly opens into the first bore, wherein the blind plug and the associated receiving bore are omitted. However, it has been shown that the small cost disadvantage caused by the named receiving bore and the blind plug is more than offset by the cost advantage associated with larger batches in the manufacture of the pot-like housing part and by lower storage costs.

It may be provided that the third control assembly comprises a 3/2-way valve. The 3/2-way valve provides the function of the neutral valve explained above. The 3/2-way valve is preferably electrically actuated, wherein in a spring-biased base point, the fluid connection from the inlet point or from the return point to the outlet point is optionally open, wherein the respective remaining connection point, namely the inlet point or the return point, is blocked.

Of course, the above-mentioned features and those to be explained below can be used not only in the combination indicated in each case, but also in other combinations or on their own, without going beyond the scope of the present disclosure.

BRIEF DESCRIPTION OF THE DRAWINGS

The disclosure is explained in more detail below with reference to the enclosed drawings. The figures show.

DETAILED DESCRIPTION

Figure 1:
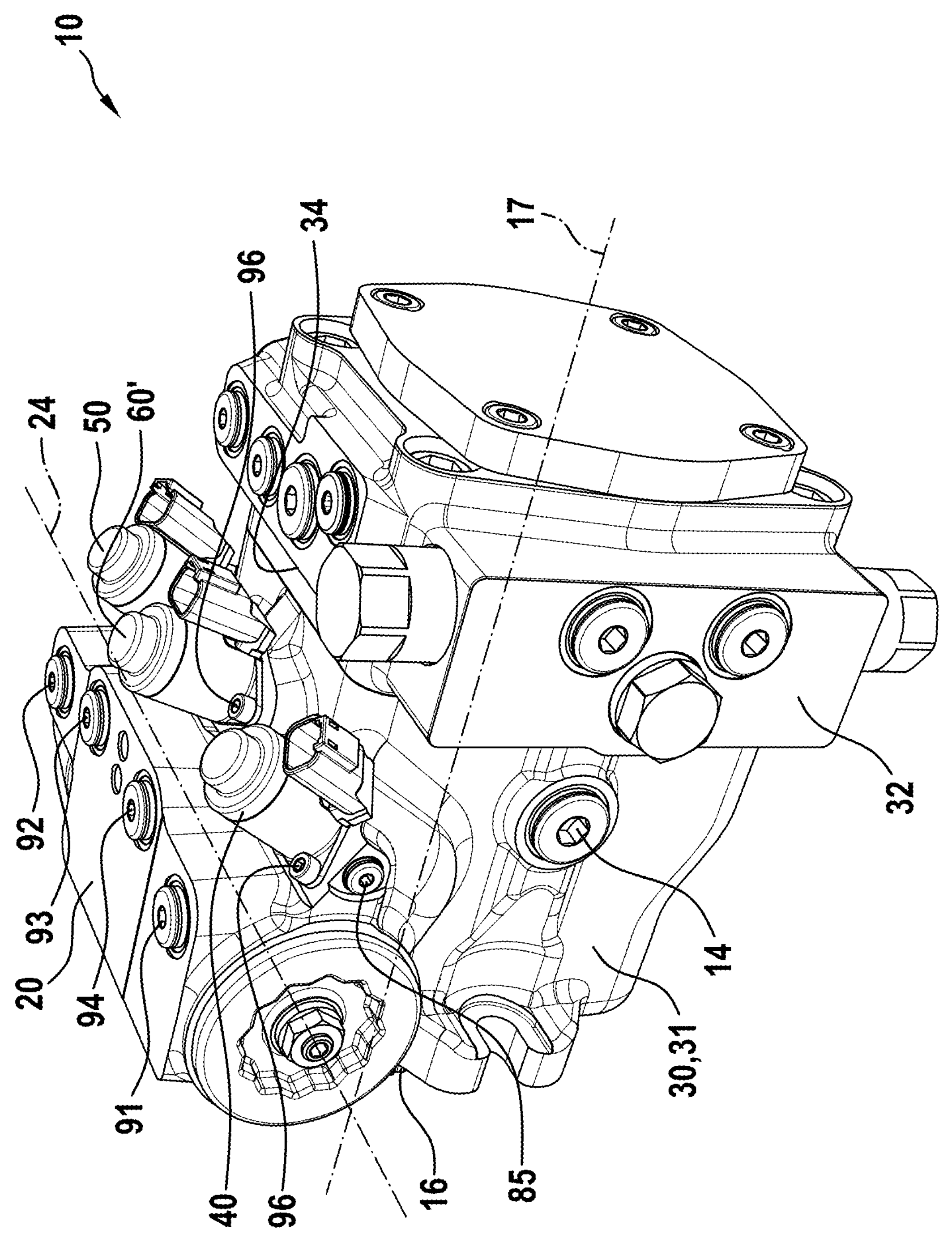
FIG. 1 a perspective view of an axial piston machine according to the disclosure.

FIG. 1 shows a perspective view of an axial piston machine 10 according to the disclosure. The axial piston machine 10 comprises a housing 30, which is composed of a pot-like housing part 31 and a plate-like housing part 32. The two housing parts 31; 32 are fixedly connected to one another, in particular screwed together, wherein they abut one another against a contact surface 34, wherein they surround an interior (no. 33 in FIGS. 9 and 10). In the present case, the contact surface 34 is flat, wherein it is arranged perpendicular to the axis of rotation 17 of the drive shaft 16.

The first and second working connections (No. 11; 12 in FIG. 2) are arranged on the plate-like housing portion 32, wherein the auxiliary pump (No. 15 in FIG. 2) is arranged within the plate-like housing portion 32. The auxiliary pump 15 may be configured as an internal gear pump, for example.

An axial piston pump/motor (No. 18 in FIG. 2) is arranged in the interior of the housing 30 and is in rotational drive connection with the drive shaft 16. In the present case, the axial piston engine is configured in a swashplate design with a continuously adjustable displacement volume. The corresponding swivel cradle is coupled to a moving control cylinder 20 to adjust the displacement volume. The control piston (No. 23 in FIG. 2) of the control cylinder moves linearly along the control axis 24. The control axis 24 is configured perpendicular to the axis of rotation 17, wherein it is arranged at distance thereto. The control cylinder 20 is arranged in the pot-like housing part 31, wherein a first, a second and a third control assembly 40; 50; 60 are arranged therein. These are each configured in the form of built-in valve, which is accommodated in an associated receiving bore (No . . . 44; 54; 64 in FIG. 8). The aforementioned receiving bores are arranged directly in the pot-like housing part 31. In the present case, the built-in valves are each fastened with two fastening screws 96, which are configured as cylinder head screws, for example. For this fastening variant, the depth of the receiving bores is particularly low.

The mentioned built-in valves are commercially available valves that have not been modified for the present axial piston machine 10. The disclosure makes use of the corresponding receiving bores being standardized so that different built-in valves can be installed in the same receiving bore. In FIG. 1, the first and second control assemblies 40; 50 are each configured as a pressure-reducing valve, which have a rising characteristic curve, for example (see FIG. 5). The third control assembly 60 is configured as a 3/2-way valve, which has a closed home position, for example (see FIG. 3). All three control assemblies 40; 50; 60 are electrically adjustable by means of an electromagnet.

The valve assembly discussed above is a frequently found variant. However, other variants are contemplated. In particular, the third control assembly 60 may be replaced by a blind plug (see FIG. 7). Only one pressure-reducing valve may be used with the first and second control assemblies 40; 50, wherein the other control assembly, namely the second or the first control assembly, are configured as a 3/2-way valve. Regarding the advantages of this variant, reference is made to DE 10 2023 210 958 B3 and DE 10 2023 210 960 B3, the contents of both which are incorporated by reference herein in their entirety. Furthermore, it is contemplated to configure both the first and second control assemblies as a 3/2-way valve.

One particular advantage of the present disclosure is that all of these variants can be provided without requiring special machining of the pot-like housing part 31. The pot-like housing part 31 is configured exactly the same in all variants. It can therefore be manufactured and stocked in large batch sizes as part of the series production of the axial piston machine, wherein it does not have to be manufactured or remachined individually for each order. This results in significant cost savings. The additional machining work necessary for this on the pot-like housing part within the context of the disclosure is very small. Accordingly, the axial piston machine 10 according to the disclosure can already be manufactured more economically than the known axial piston machine previously explained, even with low quantities.

In the area of the control cylinder 20, a first, a second, a third and a fourth measuring connection 91; 92; 93; 94 are arranged, which are typically tightly sealed by a locking screw, wherein they are used, for example, during the testing of the axial piston machine 10 in order to measure the pressures explained below. At the first or second measuring connection 91; 92, the pressure is applied in the first or second control chamber (no. 21; 22 in FIG. 2). The output pressure of the third control assembly 60 is present at the third measuring connection 93. The pressure in the interior of the housing 30 is present at the fourth measuring connection 94.

Reference should also be made to the return connection 14 on the housing 30, which is also connected to the interior in order to drain the leaks or other oil quantities occurring there to a tank. The housing 30 preferably has a plurality of such return connections 14, which are arranged at different points, in each case using the return connection 14 which is arranged lowest with respect to the direction of gravity.

Figure 2:
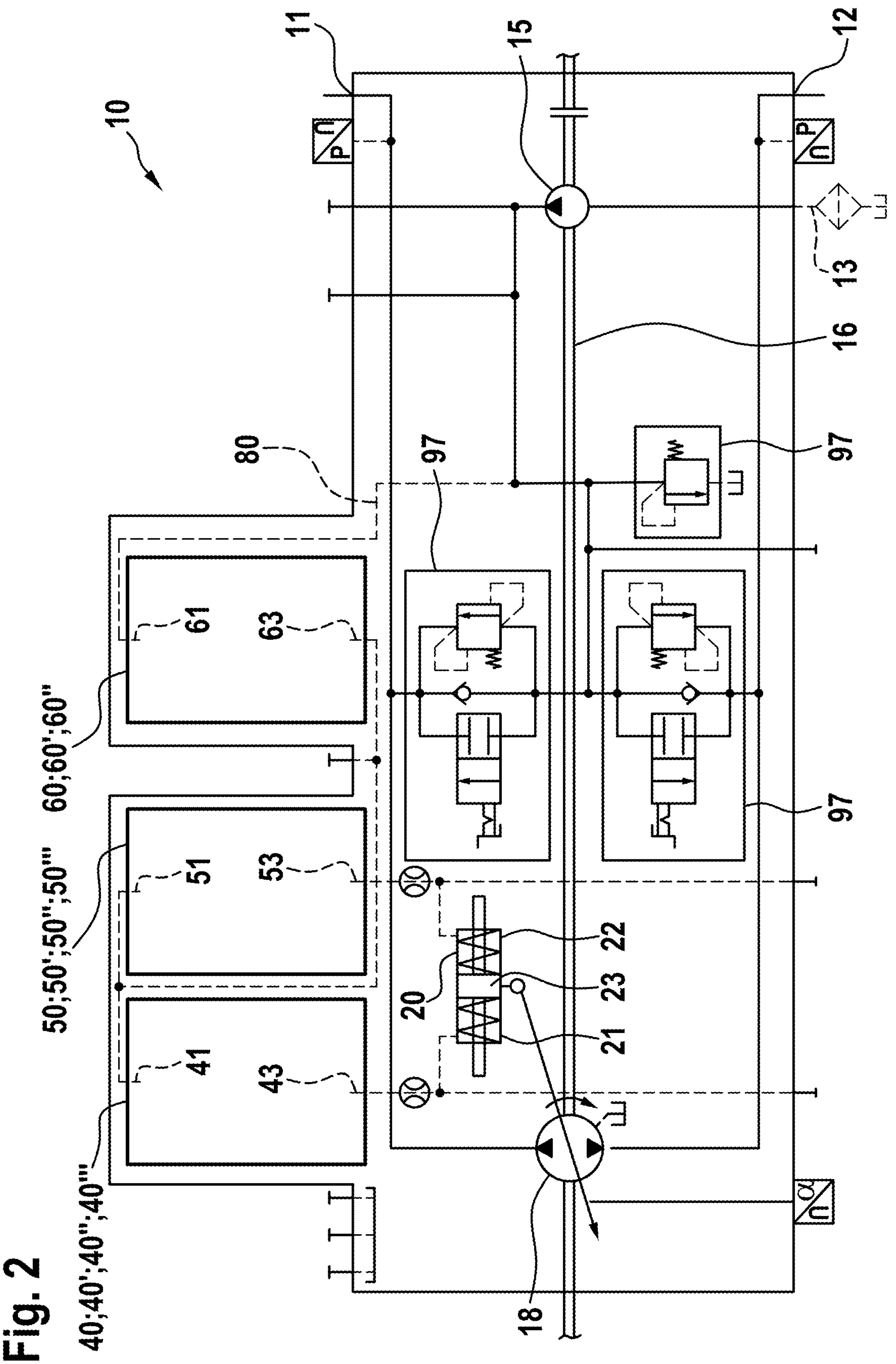
FIG. 2 a hydraulic circuit diagram of the axial piston machine of FIG. 1.

FIG. 2 shows a hydraulic circuit diagram of the axial piston machine 10 of FIG. 1. The axial piston pump/motor 18 and the auxiliary pump 15 are in rotational drive connection with the common drive shaft 16, with the drive shaft 16 being driven by, for example, an electric motor or an internal combustion engine. The axial piston pump/motor 18 is connected to the first and second working connection 11; 12, wherein it is designed for use in a closed hydraulic circuit. The displacement volume can therefore be adjusted beyond zero so that the conveying direction can be reversed simply by adjusting the swivel cradle. Furthermore, depending on the operating state, either of first or second working connections 11; 12 may carry high pressure, wherein the other, second or first, working connection 12; 11 carries low pressure. This is also referred to as 4-quadrant operation.

The auxiliary pump 15 draws in pressurized fluid from an inlet connection 13 on the housing. The pressurized fluid is preferably a liquid and in particular hydraulic oil. In the present case, the auxiliary pump 15 also serves to flush the aforementioned closed hydraulic circuit in order to avoid overheating of the pressurized fluid. Furthermore, unavoidable leaks in the closed circuit are replaced by the auxiliary pump. The feed/flush valve assembly 97 is used for this purpose.

Moreover, the auxiliary pump 15 supplies the adjustment of the control cylinder 20 with pressurized fluid. The control cylinder 20 is configured as a double-acting cylinder, comprising first and second control chambers 21; 22, which segment each other by a linearly movable piston 23 along the control axis (no. 24 in FIG. 1). The piston 23 is movably coupled to the swivel cradle of the axial piston pump/motor 18.

The first control chamber 21 is permanently connected to the outlet point 43 of the first control assembly 40; 40"; 40"; 40'". The first control assembly 40; 40'; 40"; 40'" may be optionally configured according to any one of FIG. 3; 4; 5 or 6, which is why the corresponding box in FIG. 2 is shown empty. The second control chamber 22 is permanently connected to the outlet point 53 of the second control assembly 50; 50"; 50"; 50'". The second control assembly 50; 50'; 50"; 50"" may be optionally configured according to any one of FIG. 3; 4; 5 or 6, which is why the corresponding box in FIG. 2 is shown empty.

Starting from the auxiliary pump 15, a fluid flow path passes via a transfer point 80, further via the inlet point 61 of the third control assembly 60; 60'; 60", through the third control assembly 60; 60'; 60" to the outlet point 63 of the third control assembly 60'; 60'; 60' and finally parallel to the inlet point 41; 51 of the first and the second control assemblies 40; 40'; 40"; 40'"; 50; 50'; 50"; 50'". The third control assembly 60; 60'; 60"" may be optionally configured according to any one of FIG. 3; 4 or 7, which is why the corresponding box in FIG. 2 is shown empty.

When the third control assembly 60'; 60" is configured as a 3/2-way valve, it serves as a so-called neutral valve, which is used for operational safety. In the so-called closed position of the neutral valve, both the first and second control chambers 21; 22 are connected to the substantially unpressurized interior of the housing so that the swivel cradle moves to the position in which the displacement volume is zero. In the open position of the neutral valve, the normal adjustment of the displacement volume takes place by means of the first and second control assemblies 40; 40'; 40"; 40'"; 50; 50"; 50"; 50'".

Figure 3:
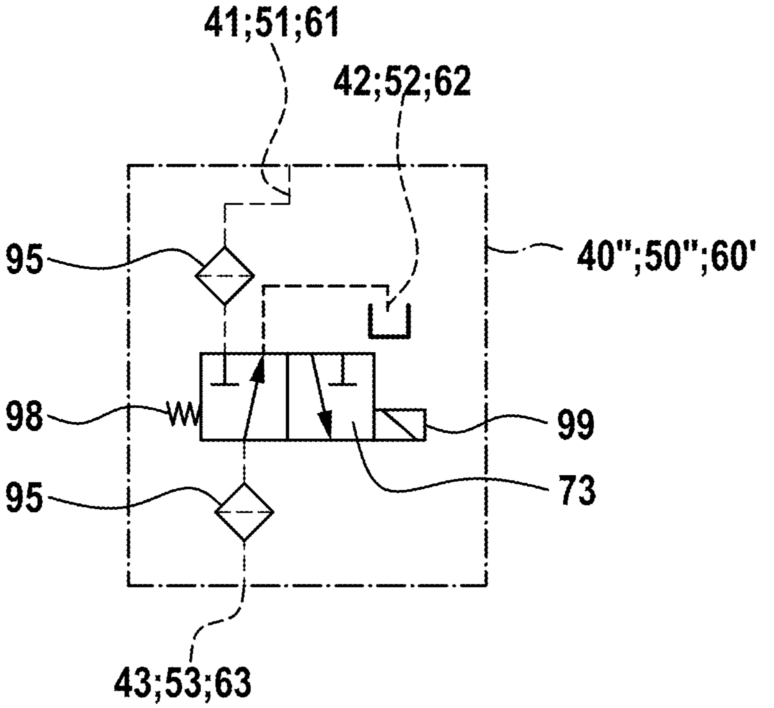
FIG. 3 a hydraulic circuit diagram of a first, second or third control assembly, respectively, comprising a 3/2-way with a closed home position.

FIG. 3 shows a hydraulic circuit diagram of a first, second or third control assembly 40"; 50"; 60, respectively, comprising a 3/2-way valve 73 with a closed home position. The home position is the left position in FIG. 3, which is biased with a spring 98. In the closed position, the connection from the inlet point 41; 51; 61 to the outlet point 43; 53; 63 is blocked, wherein the outlet point 43; 53; 63 is instead connected to the return point 42; 52; 62.

The open position is the right position shown in FIG. 3, which can be adjusted by energizing the electromagnet 99. In the open position, the connection from the inlet point 41; 51; 61 to the outlet point 43; 53; 63 is open, wherein the return point 42; 52; 62 is blocked.

Reference is still made to the filters 95, which may be provided at the inlet point 41; 51; 61 and at the outlet point 43; 53; 63. These can be configured as wire fabric or as a perforated sheet.

Figure 4:
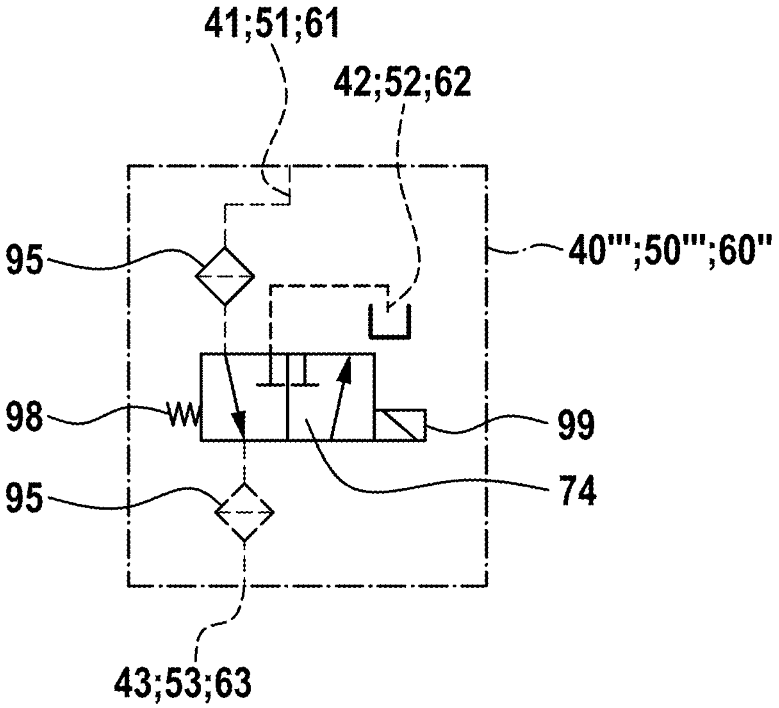
FIG. 4 a hydraulic circuit diagram of a first, second or third control assembly, respectively, comprising a 3/2-way with an open home position.

FIG. 4 shows a hydraulic circuit diagram of a first, second or third control assembly 40'"; 50'"; 60', respectively, comprising a 3/2-way valve 74 with an open home position. This is identical to the embodiment according to FIG. 3 except for the actuating direction, so that reference is made in this regard to the statements regarding FIG. 3.

The left position biased by the spring 98, on the left in FIG. 4, is now the open position, wherein the position adjustable by the electromagnet 99, in the right in in FIG. 4, is the closed position.

Figure 5:
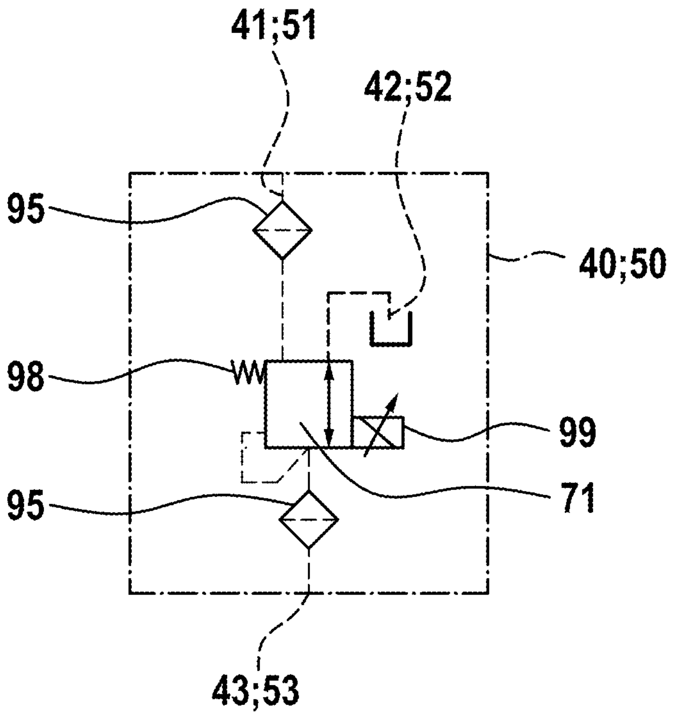
FIG. 5 a hydraulic circuit diagram of a first and second control assembly, respectively, comprising a pressure reducing-valve with a rising characteristic curve.

FIG. 5 shows a hydraulic circuit diagram of a first and second control assembly 40; 50, respectively, comprising a pressure-reducing valve 71 with rising characteristic curve. The pressure-reducing valve 71 is similar in structure to the 3/2-way valve of FIG. 3, wherein the transition between the open and closed positions are continuous. Moreover, the pressure at the outlet point 43; 53 acts on the corresponding valve slider towards the closed position. When a balance of forces has been established at the valve slider, the pressure at the outlet point 43; 53 corresponds to the pressure equivalent of the magnetic force of the electromagnet minus the force of the spring 98. The aforementioned pressure therefore increases with increasing current in the electromagnet 99, therefore one speaks of a rising characteristic curve. The biasing force of the spring is preferably designed to be low, ensuring that the closed position is set when electromagnet 99 is de-energized.

Figure 6:
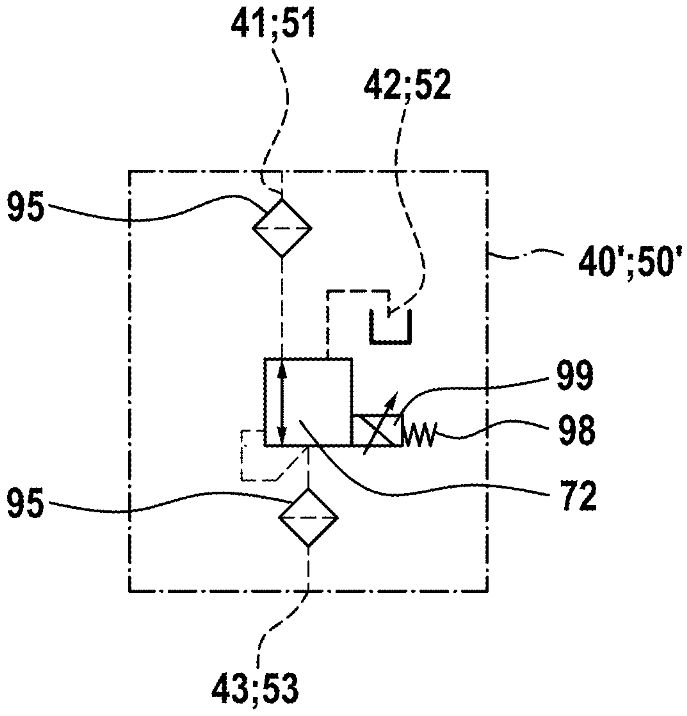
FIG. 6 a hydraulic circuit diagram of a first and second control assembly, respectively, comprising a pressure reducing-valve with a falling characteristic curve.

FIG. 6 shows a hydraulic circuit diagram of a first and second control assembly 40'; 50', respectively, comprising a pressure-reducing valve 72 with falling characteristic curve. Apart from the differences explained below, this first or second control assembly 40'; 50' is identical to that of FIG. 5, so that reference is made in this regard to the statements of FIG. 5.

The spring 98 is now configured with a high biasing force, wherein it acts on the valve slider towards the open position. For currentless electromagnets 99, there is therefore a maximum possible pressure at the outlet point 43; 53, namely substantially the pressure at the inlet point 41; 51. The electromagnet 99 is installed in such a way that it acts against the biasing force of the spring 98, so that the pressure at the outlet point 43; 53 can be lowered by energizing the electromagnet. A falling characteristic curve is therefore referred to.

Figure 7:
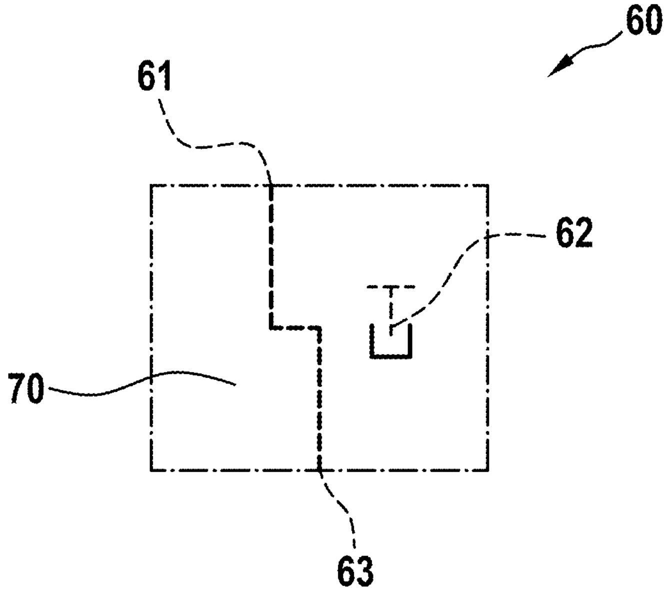
FIG. 7 a hydraulic circuit diagram of a third control assembly in the form of a blind plug.

FIG. 7 shows a hydraulic circuit diagram of a third control assembly 60 in the form of a blind plug 70. The blind plug 70 is installed in the corresponding receiving bore (no. 64 in FIG. 9) in the same way as the built-in valves described above, wherein it is configured as a rigid body. It establishes a permanent connection between the inlet point 61 and the outlet point 63, wherein the return point 62 is blocked.

Figure 8:
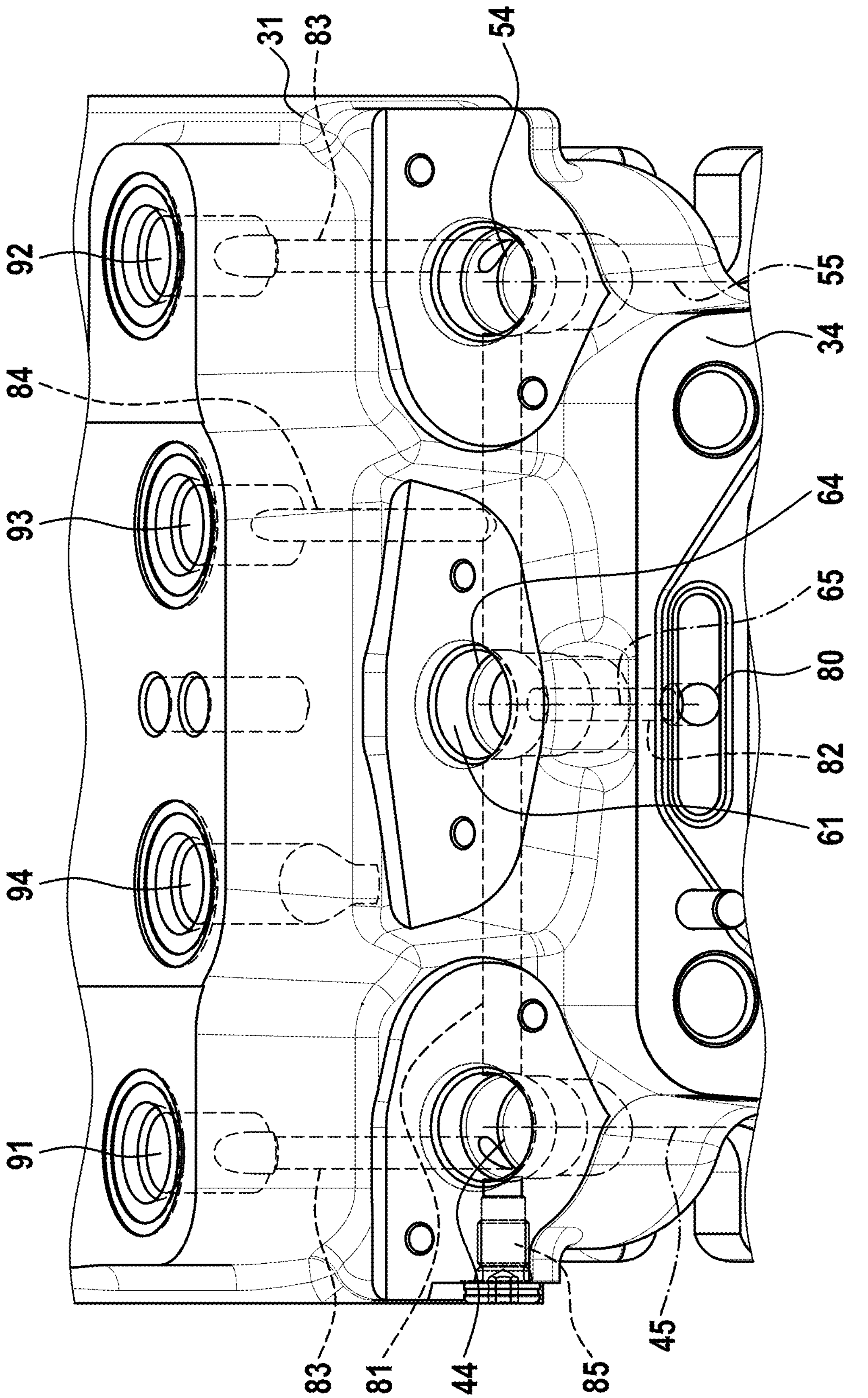
FIG. 8 a partial side view of the pot-like housing part from the plate-like housing part.

FIG. 8 shows a partial side view of the pot-like housing part 31 of the plate-like housing part. The view plane of FIG. 8 is parallel to the flat contact surface 34.

The three receiving bores 44; 64 and 54 are arranged side-by-side in a direction parallel to the control axis (no. 24 in FIG. 1). A straight second bore 82 leads from the contact surface 34 to the input point 61 of the receiving bore 64 of the third control assembly. The opening of the second bore at the contact surface 34 forms the transfer point 80. There, the pressurized fluid flowing in from the auxiliary pump is transferred from the plate-like housing part 32 to the pot-like housing part 31.

The straight first bore 81 is drilled in FIG. 8 from the left, running parallel to the control axis. The insertion opening for the drills is closed with a separate locking screw 85. The first bore 81 intersects all three receiving bores 44; 64; 54, with reference being made to the statements of FIGS. 9 and 10 for further details.

A straight fourth bore 84 leads from the third measuring connection 93 to the first bore 81. The fourth bore 84 is arranged inclined such that the corresponding drill is can be inserted from the third measuring connection 93, wherein the circle cylinder defined by the drill does not intersect the third measuring connection 93. Similarly, a straight third bore 83 leads from the first or second measuring connections 91; 92 to the receiving bore 44 and 54.

Figure 9:
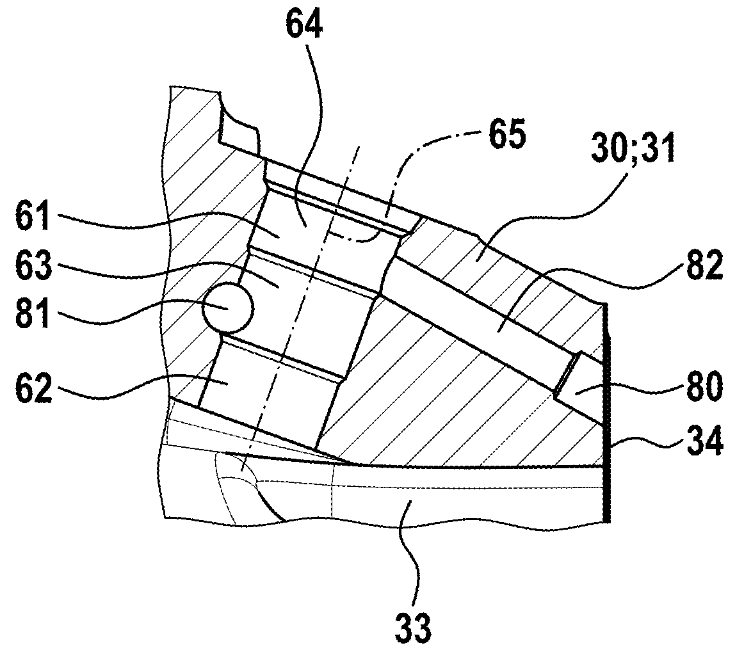
FIG. 9 a partial sectional view of the pot-like housing part in the area of the receiving bore of the third control assembly.

FIG. 9 shows a partial sectional view of the pot-like housing part 31 in the area of the receiving bore 64 of the third control assembly. The sectional plane is aligned perpendicular to the control axis (no. 24 in FIG. 1) containing the central axis 65 of the receiving bore 64. The receiving bore 64 of the third control assembly is formed as a stepped bore, each step forming a different connection point 61; 62; 63. The receiving bore 64 penetrates the wall of the pot-like housing part 31, so that it directly opens into the interior 33 of the housing 30.

The step with the largest diameter, which is arranged on the outside of the pot-like housing part 31, forms the inlet point 61 of the third control assembly. There, the second bore 82 opens.

The step with the smallest diameter, which is arranged inside the pot-like housing part 31, forms the return point 62 of the third control assembly, which is permanently connected to the interior 33 of the housing 30.

The step arranged between them in the direction of the central axis 65, which has an average diameter, forms the outlet point 63 of the third control assembly. There, the first bore 81 intersects the receiving bore 64, being arranged approximately tangential to the cylindrical wall surface of the outlet point 63 of the third control assembly.

Figure 10:
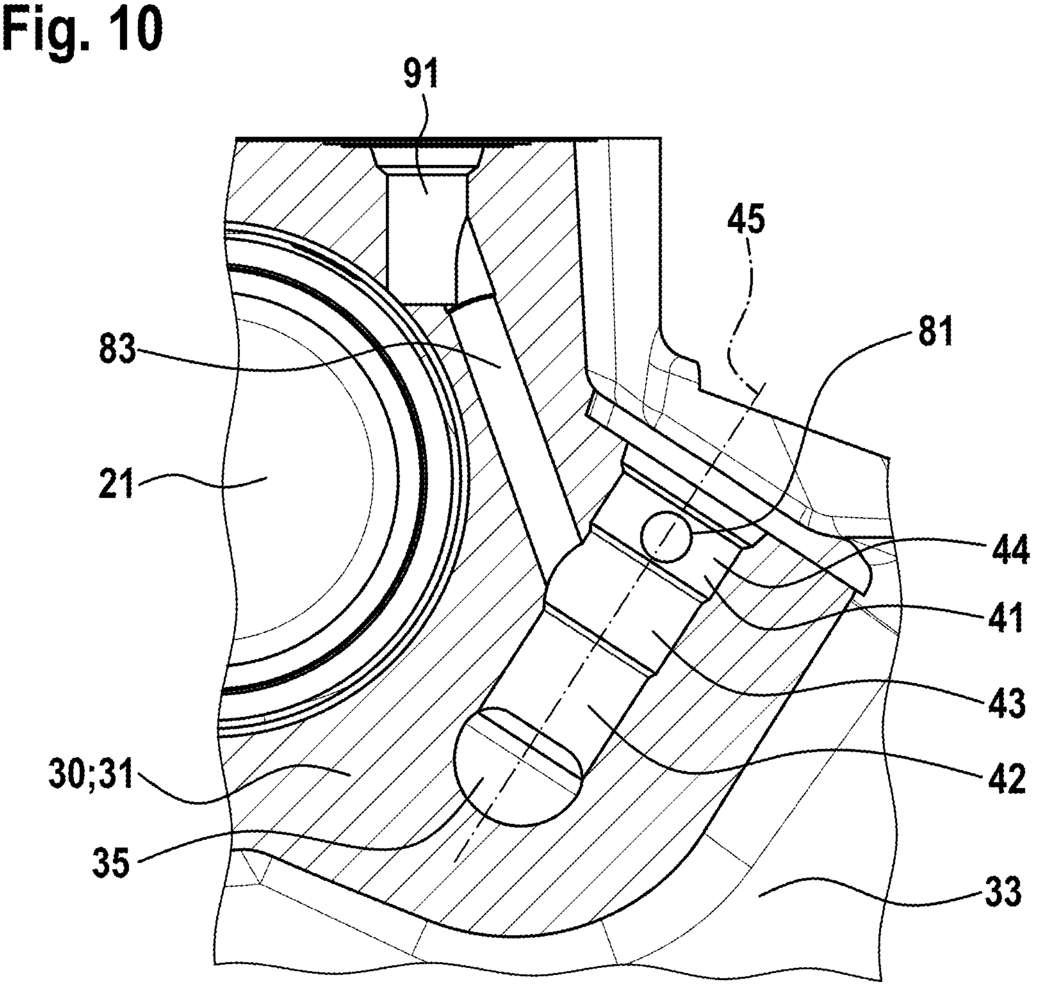
FIG. 10 a partial sectional view of the pot-like housing part in the area of the receiving bore of the first control assembly.

FIG. 10 shows a partial sectional view of the pot-like housing part 31 in the area of the receiving bore 44 of the first control assembly. The sectional plane is aligned perpendicular to the control axis 24 containing the central axis of the third bore 83. As the third bore 83 opens slightly off-center into the receiving bore 44 of the first control assembly, the said receiving bore 44 does not appear with its full diameter in FIG. 10.

First, it can be seen in FIG. 10 that the first measuring connection 91 is drilled such that it directly intersects the first control chamber 21. However, it is also contemplated that the corresponding permanent connection will be made via a further bore. The third bore 83 extends from the first measuring connection 91 in a straight line to the output point 43 of the first control assembly.

The receiving bore 44 is configured in the form of a stepped bore. The respective steps of different diameters form the connection point 41; 43; 42. The inlet point 41 of the first control assembly is formed by the outermost and therefore largest diameter step in relation to the central axis 45. There, the first bore 81 opens, preferably substantially centrally. The furthest inside and thus smallest diameter step forms the return point 42 of the first control assembly. This is connected to the interior 33 of the housing 30 via a channel 35, which runs parallel to the control axis (no. 24 in FIG. 1).

The output point 43 of the first control assembly is arranged in the direction of the central axis 45 between the inlet point 41 and the return point 42. Accordingly, this has an average diameter. There, the third bore 83 opens, preferably slightly off-center.

The receiving bore of the second control assembly is formed substantially mirror symmetrically to the receiving bore 44 of the first control assembly, this symmetry substantially covers all the details shown in FIG. 10. The corresponding plane of symmetry contains the axis of rotation (no. 17 in FIG. 1), which is aligned perpendicular to the control axis (no. 24 in FIG. 1).

REFERENCE SIGNS

10 Axial piston machine
11 First working connection
12 Second working connection
13 Inlet connection
14 Return connection
15 Auxiliary pump
16 Drive shaft
17 Axis of rotation
18 Axial piston pump/motor
20 Control cylinder
21 First control chamber
22 Second control chamber
23 Control piston
24 Control axis
30 Housing
31 Pot-like housing part
32 Plate-like housing part
33 Interior
34 Contact surface
35 Channel to the interior
40 First control assembly (first embodiment)
40' First control assembly (second embodiment)
40" First control assembly (third embodiment)

40''' First control assembly (fourth embodiment)
41 Inlet point of the first control assembly
42 Return point of the first control assembly
43 Outlet point of the first control assembly
44 Receiving bore of first control assembly
45 Central axis of the receiving bore of the first control assembly
50 Second control assembly (first embodiment)
50' Second control assembly (second embodiment)
50'' Second control assembly (third embodiment)
50''' Second control assembly (fourth embodiment)
51 Inlet point of the second control assembly
52 Return point of the second control assembly
53 Output point of the second control assembly
54 Receiving bore of the second control assembly
55 Central axis of the receiving bore of the third control assembly
60 Third control assembly (first embodiment)
60' Third control assembly (second embodiment)
60'' Third control assembly (third embodiment)
61 Inlet point of the third control assembly
62 Return point of the third control assembly
63 Output point of the third control assembly
64 Receiving bore of the third control assembly
65 Central axis of the receiving bore of the third control assembly
70 Blind plug
71 Pressure-reducing valve with rising characteristic curve
72 Pressure-reducing valve with falling characteristic curve
73 3/2-way valve with closed home position
74 3/2-way valve with open home position
80 Transfer point
81 First bore
82 Second bore
83 Third bore
84 Fourth bore
85 Closing screw of the first bore
91 First measuring connection
92 Second measuring connection
93 Third measuring connection
94 Fourth measuring connection
95 Filters
96 Fastening screw
97 Feed/flush valve assembly
98 Spring
99 Electromagnet

The invention claimed is:

1. An axial piston machine comprising:
a housing, on which a first working connection, a second working connection, a supply connection, and at least one return connection are arranged, the housing comprising a pot-like housing part and a plate-like housing part, which are fixedly connected to one another and enclose an interior;
an axial piston pump/motor, which is in fluid exchange connection with the first and second working connection;
a double-acting control cylinder arranged exclusively in the pot-like housing part and configured for continuous adjustment of a displacement volume of the axial piston pump/motor, the control cylinder comprising a first control chamber and a second control chamber;
an auxiliary pump separate from the axial piston pump/motor;
a first control assembly having a first inlet point, a first return point permanently fluidly connected to the interior of the housing, and a first outlet point permanently fluidly connected to the first control chamber;
a second control assembly having a second inlet point, a second return point permanently fluidly connected to the interior of the housing, and a second outlet point permanently fluidly connected to the second control chamber; and
a third control assembly having a third inlet point, a third return point permanently fluidly connected to an interior of the housing, and a third outlet point;
wherein the at least one return connection opens into the interior,
wherein a fluid flow path passes from the auxiliary pump via a transfer point, further via the third inlet point, to the third outlet point, and finally parallel to the first and second inlet points,
wherein the first and second working connection are arranged on the plate-like housing part,
wherein the first, second, and third control assemblies are each received on the housing, at least in sections, in a respective first, second, and third receiving bore,
wherein the transfer point is located in the fluid flow path where the plate-like housing part contacts the pot-like housing part,
wherein the first, second, and third receiving bores are each arranged directly in the pot-like housing part, and
wherein a first portion of the fluid flow path arranged downstream of the transfer point, extends over its entire length directly in the pot-like housing part.

2. The axial piston machine according to claim 1, wherein:
each of the first, second, and third receiving bores define a respective first, second, and third central axis,
the first return point, the first outlet point, and the first inlet point are arranged in order along the first central axis, and the first inlet point is arranged on a side of the first receiving bore which is open towards the surroundings of the axial piston machine,
the second return point, the second outlet point, and the second inlet point are arranged in order along the second central axis, and the second inlet point is arranged on a side of the second receiving bore which is open towards the surroundings of the axial piston machine, and
the third return point, the third outlet point, and the third inlet point are arranged in order along the third central axis, and the third inlet point is arranged on a side of the third receiving bore which is open towards the surroundings of the axial piston machine.

3. The axial piston machine according to claim 2, wherein:
the control cylinder includes a control piston that is linearly movable along a control axis,
the control piston segments the first and second control chambers from each other, and
the first, third, and second control assemblies are arranged in order next to each other in a direction parallel to the control axis.

4. The axial piston machine according to claim 3, wherein:
the first and second inlet points and the third outlet point are arranged in alignment with one another in a direction parallel to the control axis, and
a corresponding second portion of the fluid flow path is formed exclusively from a first straight bore, which directly intersects each of the first and second inlet points and the third outlet point.

5. The axial piston machine according to claim 4, wherein:

between the transfer point and the third inlet point, the fluid flow path is formed exclusively from a second straight bore the first and second straight bores are arranged substantially perpendicular to each other, and central axes of the first and second straight bores are arranged spaced apart from each other.

6. The axial piston machine according to claim 1, wherein the third receiving bore opens directly into the interior of the housing.

7. The axial piston machine according to claim 1, wherein, between the transfer point and the third inlet point, the fluid flow path is formed exclusively from a straight second bore.

8. The axial piston machine according to claim 1, wherein:

the third control assembly is formed from a blind plug which permanently establishes a fluidic connection between the third inlet point and the third outlet point, and which permanently blocks the third return point.

9. The axial piston machine according to claim 1, wherein the third control assembly comprises a 3/2-way valve.

* * * * *